(12) United States Patent
Yajima

(10) Patent No.: US 6,442,379 B2
(45) Date of Patent: Aug. 27, 2002

(54) RADIO APPARATUS AND METHOD HAVING A D.C. COMPONENT SIGNAL SUPERPOSED ON A TRANSMISSION-SIGNAL

(75) Inventor: Yuji Yajima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/321,837

(22) Filed: May 28, 1999

(30) Foreign Application Priority Data

May 28, 1998 (JP) ............................................ 10-162803

(51) Int. Cl.[7] .......................... H04B 1/02; H04B 17/00; H04B 2/04; H01P 5/12
(52) U.S. Cl. ...................... 455/129; 455/107; 455/115; 455/117; 455/92; 333/100
(58) Field of Search ........................ 455/3.3, 126, 127, 455/117, 92, 107, 115, 129; 333/100

(56) References Cited

U.S. PATENT DOCUMENTS

| | | | | |
|---|---|---|---|---|
| 5,367,268 A | | 11/1994 | Baba | 330/129 |
| 5,381,050 A | * | 1/1995 | Siclari et al. | 307/112 |
| 5,483,680 A | * | 1/1996 | Talbot | 455/107 |
| 5,956,627 A | * | 9/1999 | Goos | 455/127 |
| 6,038,432 A | * | 3/2000 | Onoda | 455/127 |
| 6,047,167 A | * | 4/2000 | Yamashita | 455/126 |
| 6,054,905 A | * | 4/2000 | Gresko | 333/100 |

FOREIGN PATENT DOCUMENTS

| | | |
|---|---|---|
| JP | 63-019101 | 7/1982 |
| JP | 6-037652 | 2/1994 |
| JP | 6-216799 | 8/1994 |

* cited by examiner

Primary Examiner—Edward F. Urban
Assistant Examiner—Meless Zewdu
(74) Attorney, Agent, or Firm—Foley & Larnder

(57) ABSTRACT

In a radio apparatus including a transmitter unit and an antenna unit, a detector is located in the vicinity of an antenna in the antenna unit rather than in the transmitter unit. The detector supplies a rectified signal from a transmission wave which is to be radiated from the antenna and the rectified signal is supplied to a control circuit in the transmission unit as a feedback component. A control signal is then determined by the control circuit based on the rectified signal and supplied to a variable attenuator to increase/decrease power of the transmission wave.

8 Claims, 3 Drawing Sheets

RADIO APPARATUS AND METHOD HAVING A D.C. COMPONENT SIGNAL SUPERPOSED ON A TRANSMISSION-SIGNAL

BACKGROUND OF THE INVENTION

1. Field of the Invention

This invention relates to a radio apparatus which is used in a base station in a mobile telephone system and which has receiving/sending equipment and an antenna, in particular, to a method of controlling the radio apparatus in which the receiving/sending equipment and an antenna are disposed apart from each other.

2. Description of the Related Art

In general, a mobile telephone system has a plurality of base stations and a great number of mobile stations communicable with the base station or stations. In this event, each of the base stations is structured by a transmitter/receiver and an antenna unit which is remote from the transmitter/receiver by several meters or so and which is connected to the transmitter/receiver through a cable, such as a coaxial cable. The transmitter/receiver is located indoors while the antenna unit is placed outdoors.

Under the circumstances, it is necessary to detect, on a side of the transmitter/receiver, failure or trouble which might occur in the antenna unit. To this end, a failure detection circuit is usually included in the transmitter/receiver of each base station to detect the failure or the trouble in the antenna unit and to produce an alarm on detection of such failure or trouble.

However, it has been found out that such a failure detection circuit can not correctly detect the failure or trouble in the antenna unit. This is because the antenna unit is distant from the transmitter/receiver, which causes a standing wave to occur on the cable between the antenna unit and the transmitter/receiver.

Specifically, occurrence of the standing wave might often result in wrong detection of the failure or trouble in the antenna unit, since the standing wave has, at a demodulating point, a node at which the standing wave becomes the smallest in amplitude.

SUMMARY OF THE INVENTION

Therefore, it is an object of the invention to solve the above problem.

It is also another object of the invention to provide a radio apparatus and method of controlling the radio apparatus which can accurately detect trouble of the antenna apparatus which is disposed apart from the receiving/sending apparatus and troubles of connecting between thereof, efficiently send a signal, and protect the sending apparatus when the troubles occur.

According to a first aspect of the invention, there is provided a radio apparatus including an antenna unit which radiates a transmission signal and a transmitter unit which supplies the transmission signal to the antenna unit through a line between the transmitter unit and the antenna unit. Here, the antenna unit comprises a coupler which partially extracts the transmission signal to produce an extracted signal and a rectifying circuit which rectifies the extracted signal into a d.c. component signal and superposes the d.c. component signal on the transmission signal. On the other hand, the transmission unit comprises a separating circuit which separates the d.c. component signal from the transmission signal.

According to a second aspect of the invention, the rectifying circuit includes a detector which rectifies the extracted signal into the d.c. component signal.

According to a third aspect of the invention, the rectifying circuit includes a first coil which superposes the d.c. component signal on the transmission signal.

According to a fourth aspect of the invention, the separating circuit includes a second coil which separates the d.c. component signal from the transmission signal.

According to a fifth aspect of the invention, the transmitter unit includes a control circuit which compares the d.c. component signal separated from the transmission signal with a predetermined reference signal and detects trouble when the d.c. component signal is lower than the predetermined reference signal.

According to a sixth aspect of the invention, the control circuit further decreases the power of the transmission signal when the d.c. component signal as lower than the predetermined reference signal.

According to a seventh aspect of the invention, the transmitter unit further comprises a variable attenuator which varies the power of the transmission signal and an arithmetic circuit which controls the variable attenuator based on a voltage level of the d.c. component signal separated from the transmission signal.

According to an eighth aspect of the invention, the transmitter unit further comprises a matching circuit which matches an impedance of the transmitter unit to that of the antenna unit and a matching control circuit which controls the matching circuit based on a voltage level of the d.c. component signal separated from the transmission signal.

According to a ninth aspect of the invention, the transmitter unit includes a control circuit which determines whether or not the d.c. component signal which is separated from the transmission signal falls within a predetermined range and detects trouble when the d.c. component signal does not fall within the predetermined range.

According to a tenth aspect of the invention, there is provided a method of controlling a radio apparatus including an antenna unit which radiates a transmission signal and a transmitter unit which supplies the transmission signal. Here, the antenna unit and the transmitter unit being connected electrically from each other, and the method comprises the steps of partially extracting, at the antenna unit, the transmission signal, rectifying, at the antenna unit, the extracted signal into a d.c. component signal, superposing, at the antenna unit, the d.c. component signal on the transmission signal, and separating, at the transmitter unit, the d.c. component signal from the transmission signal.

According to an eleventh of the invention, there is provided a method of controlling an antenna unit remote from a transmitter unit. Here, the antenna unit which radiates the transmission signal and the transmitter unit which whiles the transmission signal are included in a radio apparatus and connected electrically from each other, and the method comprises the steps of partially extracting the transmission signal, rectifying the extracted signal into a d.c. component signal, and superposing the d.c. component signal on the transmission signal.

According to a twelfth of the invention, there is provided a method of controlling a transmitter unit. Here, the transmitter unit which supplies a transmission signal and an antenna unit which radiates the transmission signal are included in a radio apparatus and connected electrically from each other, and the method comprises the step of receiving a d.c. component signal via the transmission signal from the antenna unit and separating the d.c. component signal from the transmission signal.

According to a thirteenth of the invention, the method further comprises the steps of comparing the d.c. component signal which is separated from the transmission signal with a predetermined reference signal and detecting trouble when the d.c. component signal is lower than the predetermined reference signal.

According to a fourteenth of the invention, the method further comprises the step of decreasing the power of the transmission signal when the d.c. component signal is lower than the predetermined reference signal.

According to a fifteenth of the invention, the method further comprises the steps of varying the power of the transmission signal based on a voltage level of the d.c. component signal separated from the transmission signal and controlling intensity of the transmission signal which is radiated from the antenna unit so that the intensity may be equal to a predetermined value.

According to a sixteenth of the invention, the method further comprises the step of controlling matching of an impedance of the transmitter unit to that of the antenna unit so that a voltage level of the d.c. component signal separated from the transmission signal may become maximum.

According to a seventeenth of the invention, the method further comprises the step of determining whether or not the d.c. component signal which is separated from the transmission signal falls within a predetermined range and detecting trouble when the d.c. component signal does not fall within the predetermined range.

DESCRIPTION OF THE PREFERRED EMBODIMENT

First Embodiment of the Invention

Hereinafter, descriptions will be made about a first embodiment of the invention with reference to accompanying drawings.

Figure 1:
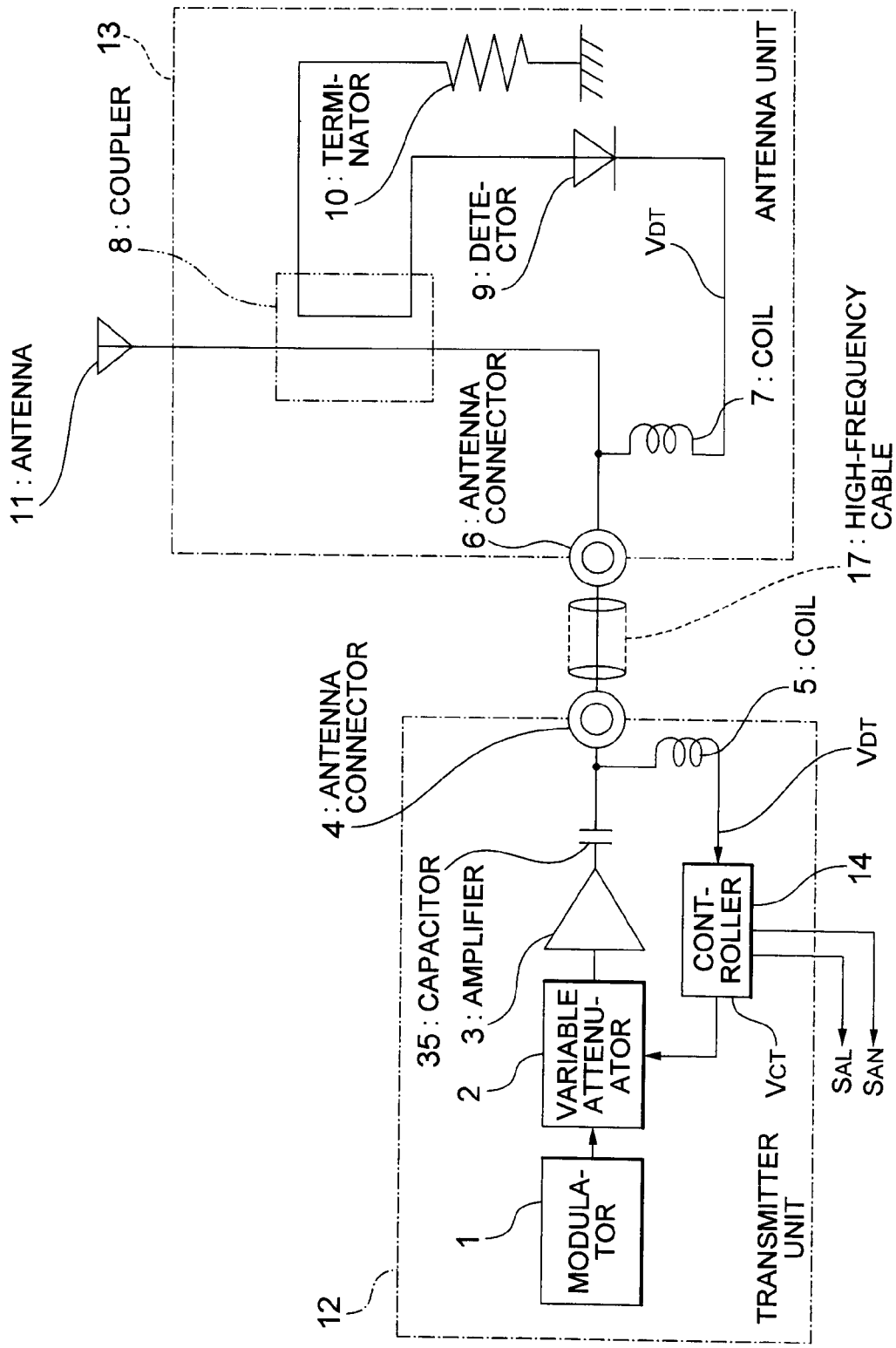
FIG. 1 shows a block diagram of a radio apparatus according to a first embodiment of the invention.

As shown in FIG. 1, a radio apparatus according to the first embodiment of the invention includes a transmitter unit 12 which may be incorporated in a transmitter/receiver (not shown) disposed indoors and an antenna unit 13 which is close to an antenna 11 and which is disposed outdoors.

Also, the transmitter unit 12 and the antenna unit 13 are connected to each other through a high-frequency cable 17, such as a coaxial cable.

In FIG. 1, the transmitter unit 12 includes a modulator 1 which produces a modulated wave, a variable attenuator 2 which has a variable attenuation factor controlled by a control circuit 14 as described later, and an amplifier 3.

The modulated wave which is modulated by the modulator 1 is supplied to the amplifier 3 through the variable attenuator 2.

The modulated wave is amplified by the amplifier 3 into an amplified signal of predetermined electric power, and is supplied from an antenna connector 4 through a capacitor 35. The capacitor 35 serves to cut a d.c. component.

The antenna connector 4 is connected to one end of a coil 5, and the other end of the coil 5 is connected to the control circuit 14.

The coil 5 has an inductance specified by a high reactance value at a frequency of the modulated wave (for example 1.9 GHz) and, consequently, allows only a d.c. component to pass therethrough.

The control circuit 14 supplies a control voltage $V_{ct}$ having a value based on the d.c. component which passes through the coil 5 and controls the attenuation factor of the above-described variable attenuator 2 and produces an ALC alarm signal SAL when any failure is detected by the control circuit 14.

An antenna connector 6 is attached to the antenna unit 13 and is connected to the antenna 11 through a coupler 8 including a directional coupler.

One end of the coupler 8 is terminated through a terminator 10, such as resistor, while the other end of the coupler 8 is connected to a detector 9.

The illustrated detector 9 is formed by a diode for rectification. The diode may be replaced by a smoothing circuit including a capacitor.

In the illustrated example, the detector 9 has an anode electrode connected to the coupler 8 and a cathode electrode connected to the antenna connector 6 through a coil 7.

The coil 7 also has an inductance specified by a high reactance value at a frequency of a transmission wave sent through the antenna 11.

The transmission wave is obtained by being modulated by the modulator 1 of the transmitter unit 12 to be attenuated at the variable attenuator 2 to a predetermined level which is determined under control of the control circuit 14 and to be amplified by the amplifier 3.

The amplifier 3 amplifies the modulated wave into the amplified signal to supply the amplified signal to the antenna connector 4 as the transmission signal.

Then, the transmission wave is supplied from the antenna connector 6 to the antenna unit 13, and radiated from the antenna 11 through the coupler 8.

The transmission wave which is supplied from the antenna connector 6 to the antenna unit 13 is partially separated through the coupler 8. The detector 9 rectifies the output of the coupler 8 to generate a rectified voltage $V_{DT}$. The rectified voltage $V_{DT}$ is then superposed to the original transmission wave through the coil 7.

On the other hand, the rectified voltage $V_{DT}$ is partially sent back to the transmitter unit 12 and is taken out by the coil 5 to be supplied to the control circuit 14. ache control circuit 14 executes an ALC (Automatic Level Control) operation to control the attenuation factor of the variable attenuator 2 based on the rectified voltage $V_{DT}$.

Figure 2:
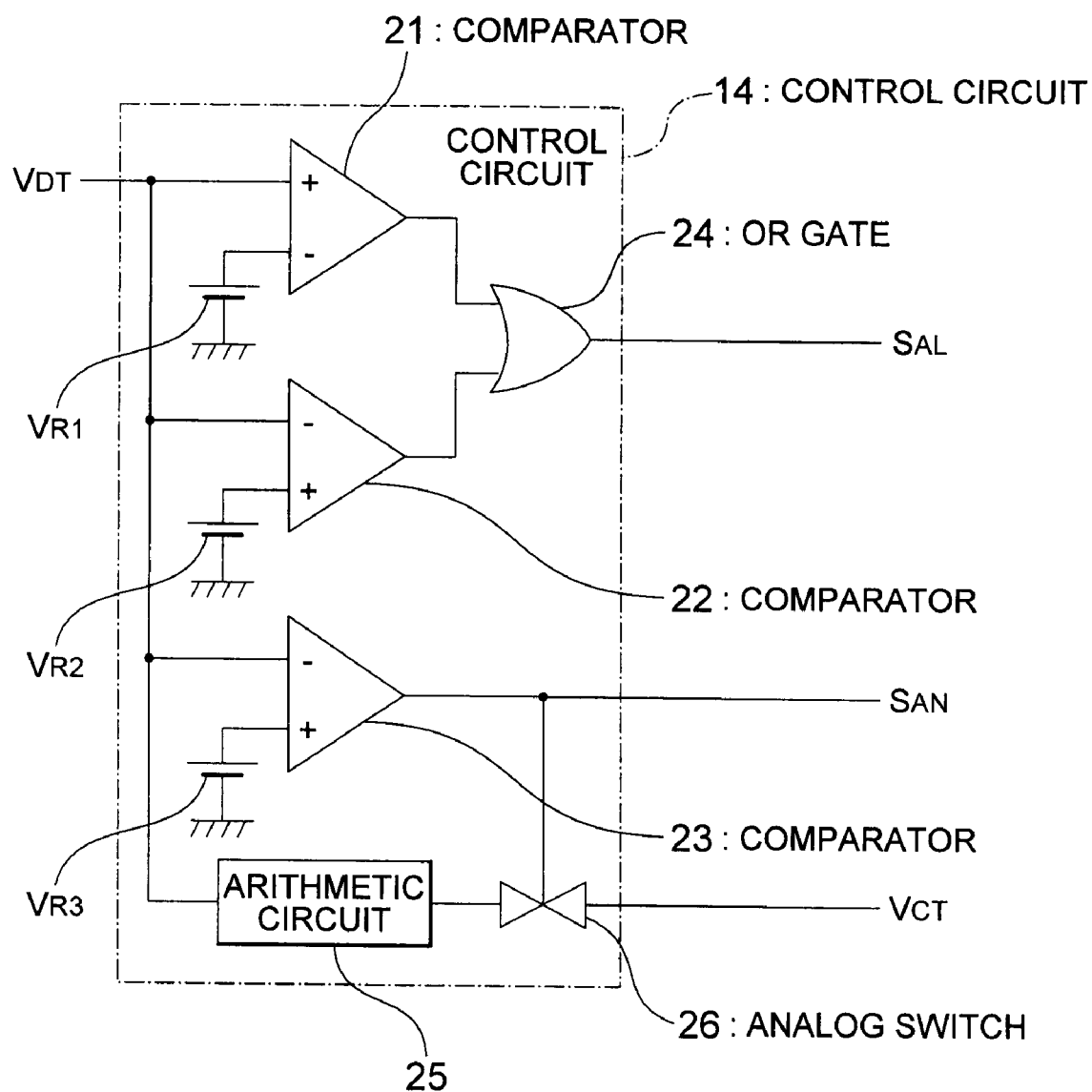
FIG. 2 shows a block diagram of an example of a control circuit 14 of the first embodiment shown in FIG. 1.

In FIG. 2, the control circuit 14 includes comparators 21, 22, and 23.

The comparators 21 and 22 are given reference voltages $V_{R1}$ (in this embodiment, 4 [V]) and $V_{R2}$ (in this embodiment, 1 [V]), respectively. Comparison results of the comparators 21 and 22 are supplied as ALC alarm signals $S_{AL}$ through an OR gate 24.

On the other hand, the comparator 23 is given a reference voltage $V_{R3}$ (in this embodiment, 0.5 [V]). Comparison result of the comparator 23 is produced as antenna alarm signal $S_{AN}$.

The control circuit 25 further includes an arithmetic circuit which is operable in response to the control voltage $V_{CT}$ based on the rectified voltage $V_{DT}$. A detailed description and a figure about the arithmetic circuit 25 will be omitted because the arithmetic circuit 25 itself is known in the art.

The control voltage $V_{CT}$ supplied from the arithmetic circuit is provided through an analog switch 26, wherein the signal $S_{AN}$ from the comparator 23 is given to a control input terminal of the analog switch 26.

In this embodiment, the variable attenuator 2 is adjusted or trimmed so that a standard output may be supplied, and the rectified voltage $V_{DT}$ at that time is set as the reference value (in this example, 3.0[V]).

The control circuit 14 increases the attenuation factor to decrease power of the transmission wave when the rectified voltage $V_{DT}$ is higher than the predetermined reference value (for example, $V_{DT}$=3.5[V]). On the other hand, the control circuit 14 decreases the attenuation factor to increase power of the transmission wave when the rectified voltage $V_{DT}$ is lower than the predetermined reference value (for example, $V_{DT}$=2.5[V]).

The control circuit 14 converges the rectified voltage $V_{DT}$ (for example, 3[V]) by the above mentioned operations.

Also, the control circuit 14 supplies the ALC alarm signal $S_{AL}$ when the rectified voltage $V_{DT}$ does not fall within the predetermined voltage range. Therefore, in this embodiment, the ALC alarm signal $S_{AL}$ is supplied when the rectified voltage $V_{DT}$ exceeds 4 [V] or is lower than 1 [V].

In this embodiment, when any trouble occurs in electrical connection between the antenna connector 4 and the antenna connector 6 (for example, breakage of a wire), the transmission wave is not transmitted to the antenna unit 13. Thereby, the detector 9 cannot produce the rectified voltage $V_{DT}$ and, as a result, the rectified voltage $V_{DT}$ is not sent back to the transmitter unit 12.

Therefore, the voltage supplied to the control circuit 14 is close to 0. However, when the ALC operations are continued in the Move case, the amplifier 3 generates maximum output since the control circuit 14 minimizes the attenuation factor of the variable attenuator 2.

In order to avoid the above-mentioned situation, the control circuit 14 not only cuts off the control voltage $V_{DT}$ to decrease output power of the amplifier 3 but also produces the antenna alarm signal $S_{AL}$ when voltage supplied to the control circuit 14 is low (in this embodiment, less than or equal to 0.5 [V]).

Second Embodiment of the Invention

Hereinafter, a description is made about a second embodiment of the invention with reference to FIG. 3. Also, parts shown in FIG. 3 each of which is the same as the corresponding part shown in FIG. 1 have the same numeric symbols as the corresponding parts shown in FIG. 1, and description will be omitted about the same parts.

Figure 3:
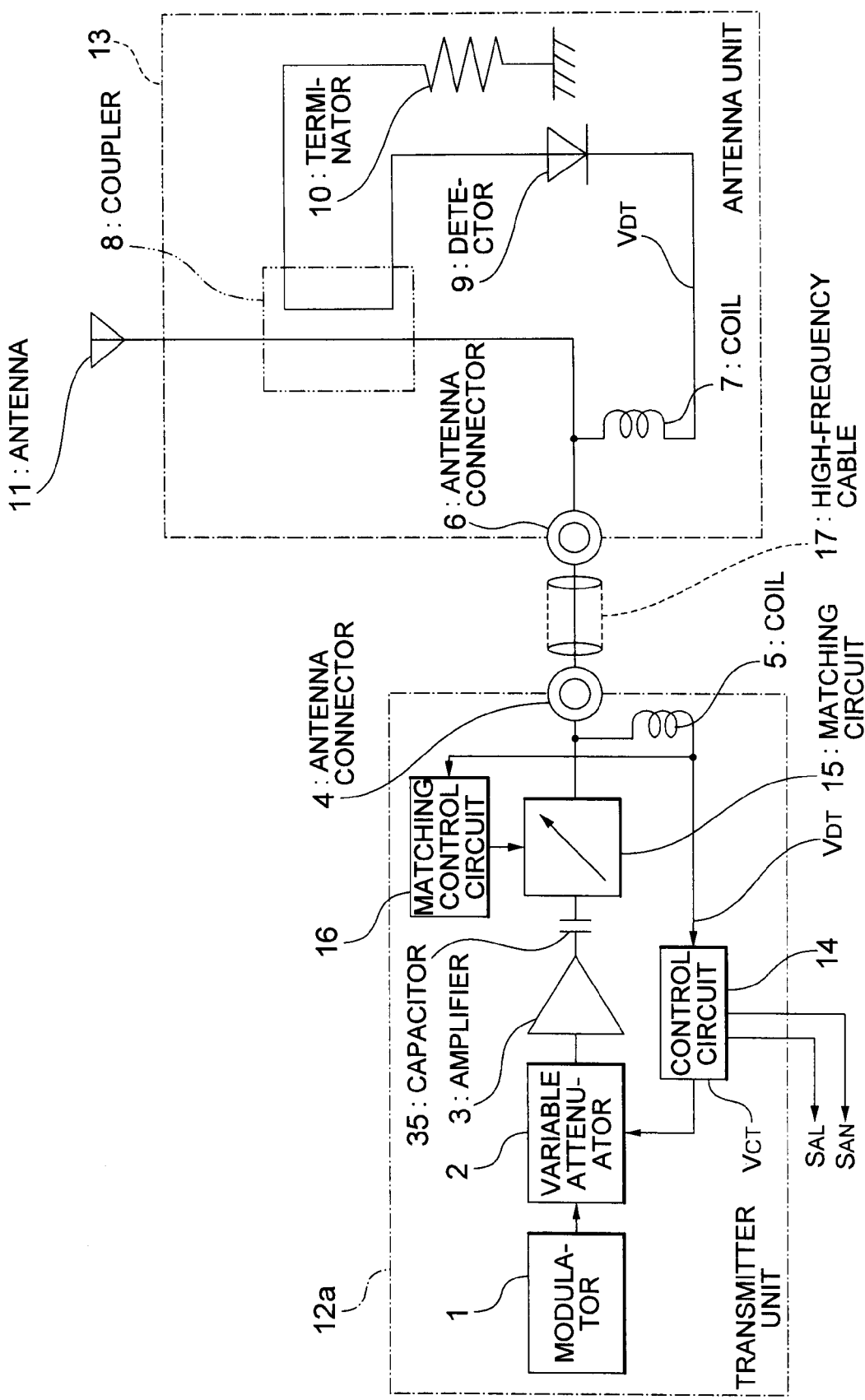
FIG. 3 shows a block diagram of a radio apparatus according to a second embodiment of the invention.

In FIG. 3, a transmitter unit 12a includes a matching circuit 15, which is formed, for example, by a coil for resonance or variable capacitor for controlling voltage.

In the illustrated transmitter unit 12a, the transmission wave supplied from an amplifier 3 is provided to the antenna connector 4 through a capacitor 35 and the matching circuit 15.

In this embodiment, a matching control circuit 16 controls the matching circuit 15 and determines a matching point by retrieving a point which has maximum rectified voltage $V_{DT}$.

The Matching point is then stored in the matching control circuit 16 and is held until the antenna 11 is modified.

A description about operations after the determining operation, namely ALC operation will be omitted since the operations are the same as those of the first Embodiment of the invention.

According to the invention, transmission output can be kept at a certain level, regardless of the distance between a transmitter unit and an antenna since the detector is located in the vicinity to the antenna rather than inside the transmitter unit.

Also, according to the invention, the detector cannot rectify the transmission wave when the antenna is not connected to the transmitter unit since the illustrated antenna unit has a demodulation circuit. Therefore, it is easy to determine whether the antenna unit is normally connected or not.

Further, according to the invention, it is previously possible to know an impedance between the transmitter unit and the antenna unit since the detector is included in the antenna unit. Further, the antenna unit is correctly matched with the transmitter unit in impedance since the above-mentioned impedance can be fed back to the matching circuit.

What is claimed is:

1. A radio apparatus including an antenna unit which radiates a transmission signal and a transmitter unit which supplies the transmission signal to the antenna unit through a line between the transmitter unit and the antenna unit, the antenna unit comprising:
   a coupler which partially extracts the transmission signal to produce an extracted signal; and
   a rectifying circuit which rectifies the extracted signal into a d.c. component signal and superimposes the d.c. component signal on the transmission signal;

the transmission unit comprising:
   a separating circuit which separates the d.c. component signal from the transmission signal,
   a matching circuit which matches an impedance of the transmitter unit to that of the antenna unit; and
   a matching control circuit which controls the matching circuit based on a voltage level of the d.c. component signal separated from the transmission signal.

2. A method of controlling a radio apparatus including an antenna unit which radiates a transmission signal and a transmitter unit which supplies the transmission signal, the antenna unit and the transmitter unit being connected electrically to each other, the method comprising the steps of:

partially extracting, at the antenna unit, the transmission signal;

rectifying, at the antenna unit, the extracted signal into a d.c. component signal;

separating, at the transmitter unit, the d.c. component signal from the transmission signal; and controlling matching of an impedance of the transmitter unit to that of the antenna unit so that a voltage level of the d.c. component signal separated from the transmission signal becomes maximum.

3. A method of controlling an antenna unit remote from a transmitter unit, the antenna unit which radiates the transmission signal and the transmitter unit which supplies the transmission signal being included in a radio apparatus and connected electrically to each other, the method comprising the steps of:

partially extracting, at the antenna unit, the transmission signal;

rectifying, at the antenna unit, the extracted signal into a d.c. component signal;

superposing, at the antenna unit, the d.c. component signal on the transmission signal;

receiving the d.c. component signal at the transmitter unit; and controlling matching of an impedance of the transmitter unit to that of the antenna unit so that a voltage level of the d.c. component signal separated from the transmission signal becomes maximum.

4. A method of controlling a transmitter unit, the transmitter unit which supplies a transmission signal and an antenna unit which radiates the transmission signal being included in a radio apparatus and connected electrically to each other, the method comprising the steps of:

receiving a d.c. superimposed transmission signal from the antenna unit; and separating the superimposed d.c. component signal from the d.c. superimposed mission signal; and controlling matching of an impedance of the transmitter unit to that of the antenna unit so that a voltage level of the superimposed d.c. component signal separated from the d.c. superimposed transmission signal becomes maximum.

5. A method as claimed in claim 4 further comprising the steps of:

comparing the d.c. component signal which is separated from the transmission signal with a predetermined reference signal; and detecting trouble when the d.c. component signal is lower than the predetermined reference signal.

6. A method as claimed in claim 5 further comprising the step of:

decreasing the power of the transmission signal when the d.c. component signal is lower than the predetermined reference signal.

7. A method as claimed in claim 6 further comprising the steps of:

varying the power of the transmission signal based on a voltage level of the d.c. component signal separated from the transmission signal; and controlling intensity of the transmission signal which is radiated from the antenna unit so that the intensity may be equal to a predetermined value.

8. A method as claimed in claim 4 further comprising the step of:

determining whether or not the d.c. component signal which is separated from the transmission signal falls within a predetermined range: and detecting trouble when the d.c. component signal does not fall within the predetermined range.

* * * * *